United States Patent [19]

France et al.

[11] Patent Number: 4,572,312

[45] Date of Patent: Feb. 25, 1986

[54] MECHANISM FOR ENABLING A VEHICLE BONNET TO BE OPENED AND CLOSED

[75] Inventors: Michael France; Rodney Booth, both of Huddersfield, England

[73] Assignee: Case Poclain Corporation Ltd., Huddersfield, England

[21] Appl. No.: 410,169

[22] Filed: Aug. 20, 1982

[30] Foreign Application Priority Data

Aug. 27, 1981 [GB] United Kingdom ............... 8126137
Feb. 5, 1982 [GB] United Kingdom ................. 8203434

[51] Int. Cl.⁴ .............................................. B62D 25/10
[52] U.S. Cl. ................................ 180/69.21; 180/89.17
[58] Field of Search .................. 180/69.2, 69.21, 89.13, 180/89.14, 89.15, 89.16, 89.17, 89.18; 292/DIG. 14

[56] References Cited

U.S. PATENT DOCUMENTS

| | | | |
|---|---|---|---|
| 2,193,111 | 3/1940 | Peterson | 180/69.21 |
| 3,767,001 | 10/1973 | Chupick | 180/69.21 |
| 3,805,909 | 4/1974 | Koeppen | 180/69.21 |
| 4,125,170 | 11/1978 | Botz | 180/69.21 |

FOREIGN PATENT DOCUMENTS 622046 4/1949 United Kingdom ............. 180/69.21

Primary Examiner—John J. Love
Assistant Examiner—Joseph G. McCarthy

[57] ABSTRACT

To enable a tractor bonnet to be opened and closed it is pivotably connected near its front end to longer arms of respective laterally-spaced interconnected bell-crank levers which are pivotably mounted about a common transverse axis on an upstanding sub-frame secured to the tractor's main frame. When the bonnet has been initially moved forwardly, thus pivoting the levers relative to both the bonnet and the sub-frame, the shorter arms of the levers abut against the sub-frame whereafter the rear end of the bonnet is secondarily moved upwardly and forwardly into opened position by pivoting the bonnet relative to the stationary levers. The bonnet is closed by performing the same movements in reverse sequence, a transverse arch preferably being so fixed relative to the main frame as to guide the bonnet near the end of its initial closing movement.

2 Claims, 5 Drawing Figures

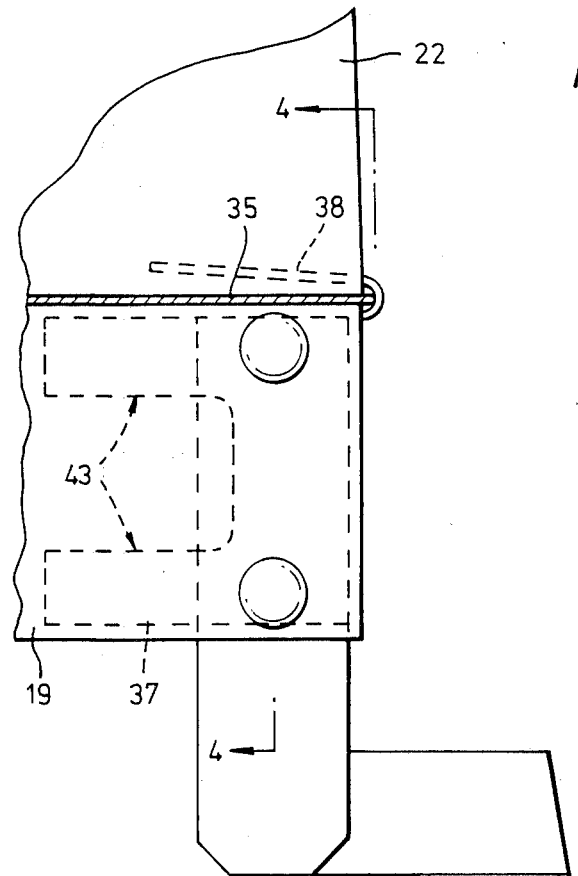
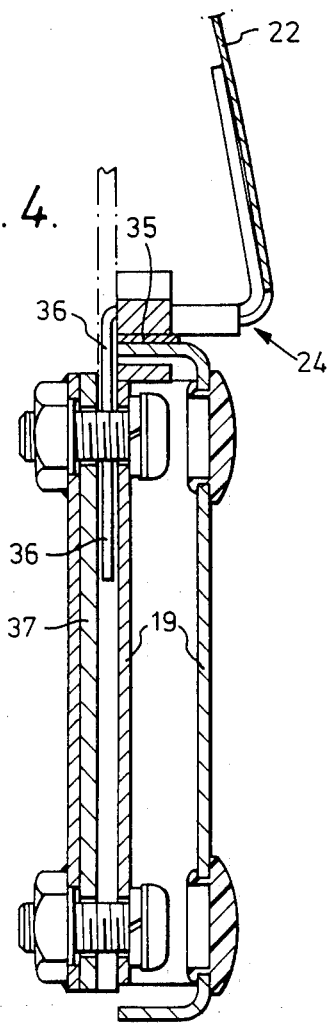
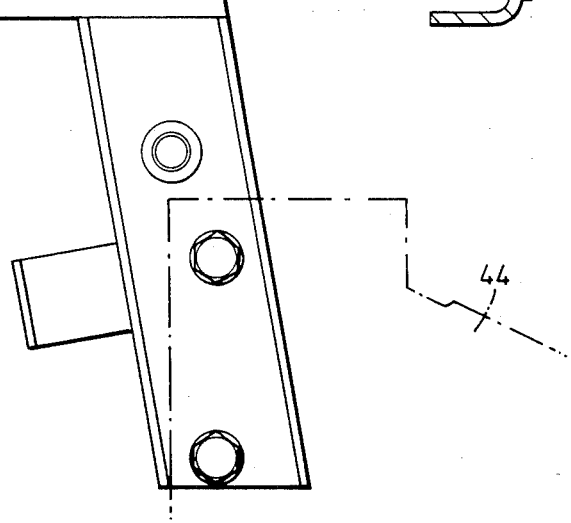

MECHANISM FOR ENABLING A VEHICLE BONNET TO BE OPENED AND CLOSED

BACKGROUND OF INVENTION

This invention relates to mechanism for enabling a vehicle bonnet to be opened and closed, and has for its object to provide good access to the space beneath the bonnet which usually contains the vehicle's engine and its ancillaries.

SUMMARY OF INVENTION

According to the invention, mechanism for enabling a vehicle bonnet to be opened and closed comprises two laterally-spaced bell-crank levers pivotable about a common axis disposed transversely on the vehicle's frame near the front end thereof, one arm of each lever extending rearwardly when the bonnet is closed and being pivotably connected to the adjacent side of the bonnet, and the other arm of each lever being arranged to abut against a stop on the frame when the bonnet has been initially moved forwardly by simultaneously pivoting the bonnet relative to the lever and the lever relative to the frame, whereafter the rear end of the bonnet is secondarily moved upwardly and forwardly into opened position by pivoting the bonnet relative to the stationary lever, the bonnet being closed by performing the same movements in reverse sequence.

BRIEF DESCRIPTION OF DRAWINGS

A preferred embodiment of the invention will now be described, by way of example, with reference to the accompanying drawings in which:

FIG. 4 is a section on the line 4—4 in FIGS. 2 and 5 of a detail drawn on a larger scale; and FIG. 5 is a detailed modification on an intermediate scale.

DESCRIPTION OF PREFERRED EMBODIMENT

Figure 1:
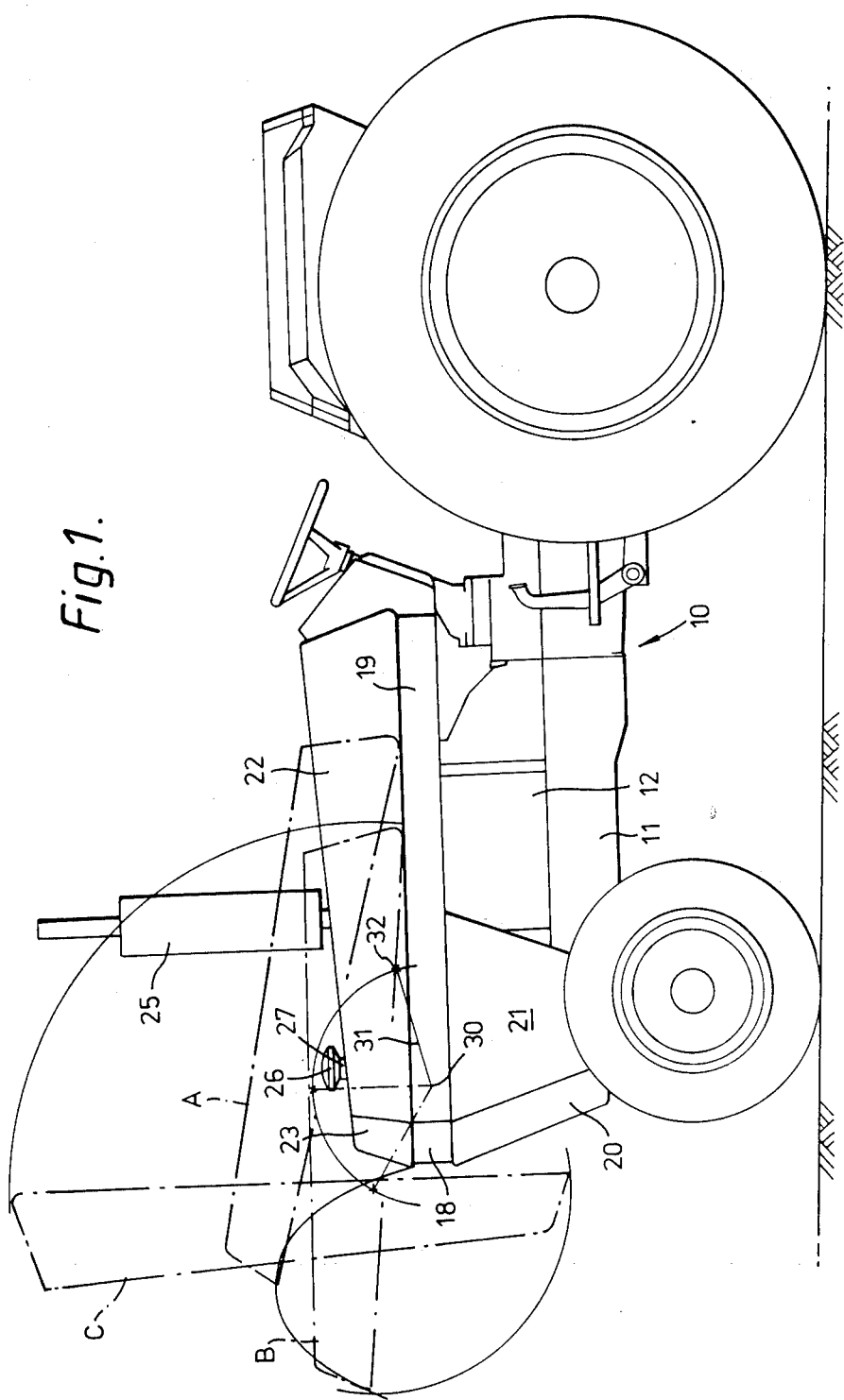
FIG. 1 is a side elevation of an agricultural tractor with its bonnet shown in closed position in full line and in partially and almost fully opened positions in dotted lines.
Figure 2:
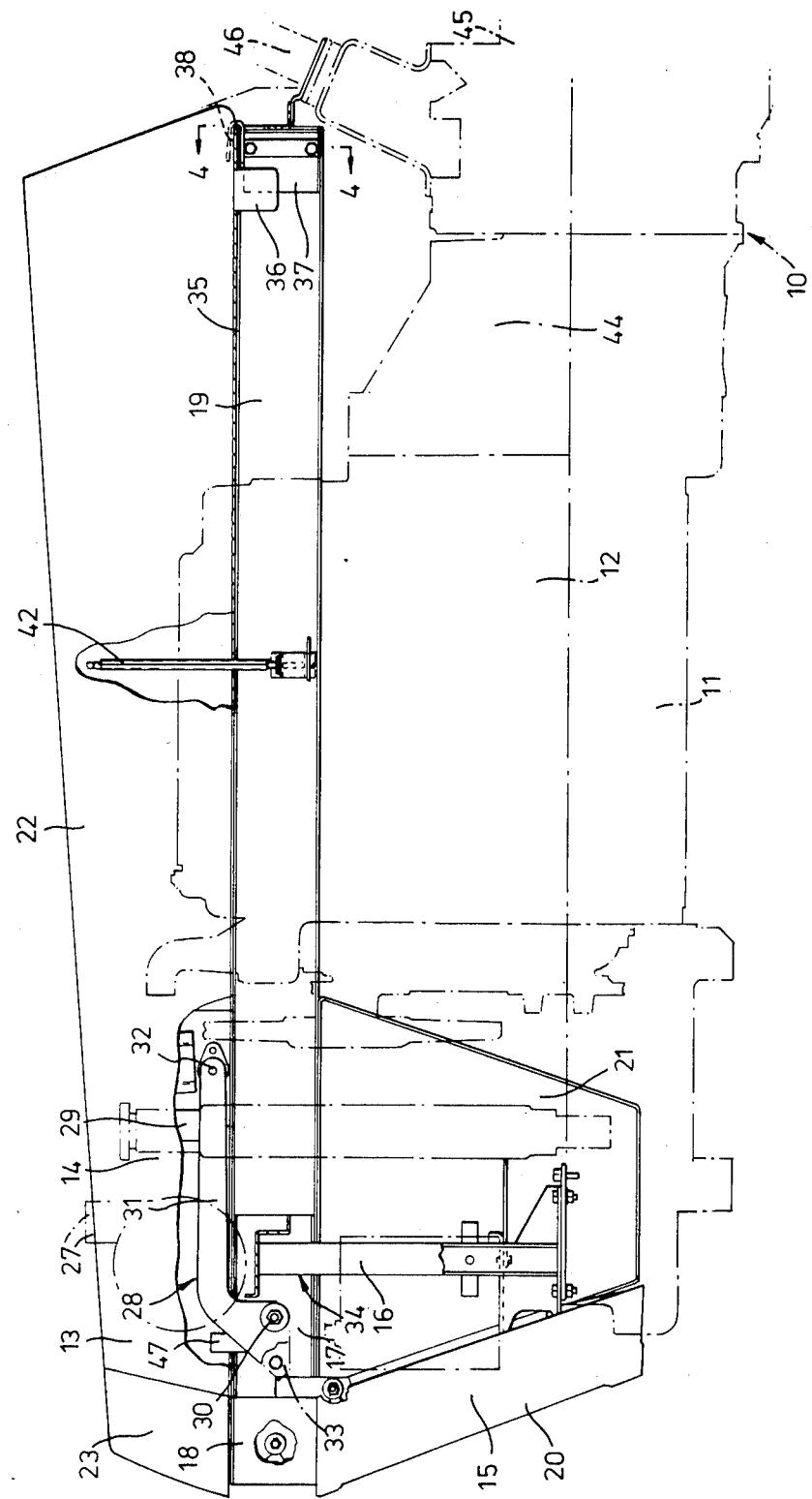
FIG. 2 is a side elevation of the front part of the tractor with parts omitted for clarity.
Figure 3:
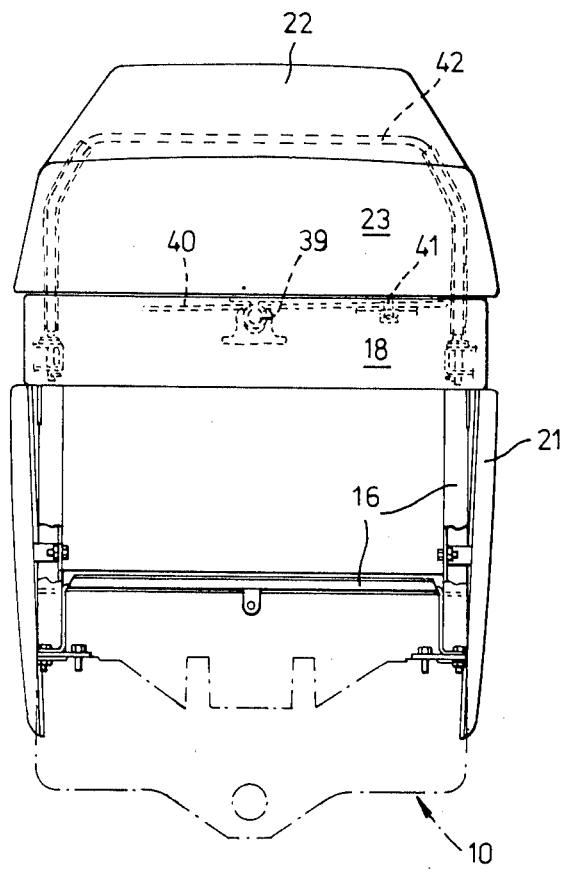
FIG. 3 is a front elevation of the front part of the tractor with a part omitted for clarity.

Referring now to FIGS. 2 to 4 of the drawings, an agricultural tractor has a conventional rigid main frame indicated generally at 10, a part 11 of the front portion of which constitutes a sump for the tractor's engine 12. A clutch cover 44 and a gearbox cover 45 supporting a steering column 46 are rigidly secured to the main frame 10. A radiator 14 for the engine's cooling system is mounted in front of the engine 12, the tractor's battery 15 is mounted in front of the radiator 14, and an air cleaner 13 is mounted above the battery 15. A transverse vertical sub-frame 16 with a forward extension 17 at its upper end is rigidly secured to the main frame 10 in front of the radiator 14, and separately disconnectibly secured to the sub-frame are a horizontal sheet metal front waist-rail 18 and two horizontal sheet metal side waist-rails 19 which converge slightly in a rearward direction and are disposed along the respective sides of the engine 12. A plastics surround 20 for a perforated sheet metal front grille (not shown) is disconnectibly secured to the sub-frame 16 beneath the front waist-rail 18, and is omitted for clarity in FIG. 3. Two sheet metal side panels 21 filling the front ends of the spaces between the respective side waist-rails 19 and the main frame 10 are integral with said waist-rails. In FIG. 2, the side waist-rail 19 and the side panel 21 on that side of the tractor nearer the viewer have been omitted for clarity. A sheet metal bonnet 22 with a plastics front end member 23 rests, in its closed position, on the horizontally aligned upper edges of the front and side waist-rails 18, 19. The bonnet 22 is arched in transverse cross-section, its sides have the same rearward convergence as the side waist-rails 19, and the lower edge of each of its sides is turned inwardly as indicated at 24 in FIG. 4. As shown in FIG. 1, an upright exhaust pipe and silencer assembly 25 which is a push fit on the engine's exhaust gas outlet passes through one hole in the bonnet 22, and a stack cap 26 is a push fit on the air cleaner's inlet stack 27 which passes through another hole in the bonnet 22, the assembly 25 and the cap 26 being readily removeable when the bonnet 22 is to be opened.

Mechanisms for enabling the bonnet 22 to be moved to a fully opened position slightly forward of vertical with the respective inwardly-turned lower edges 24 of its sides abutting near their front ends against the surround 20, and to be closed, comprises two laterally-spaced bell-crank levers indicated generally at 28 which are rigidly interconnected by a transverse bar 29 and pivotably mounted near the upper end of the sub-frame 16 about a common transverse axis 30. One arm 31 of each lever extends rearwardly when the bonnet 22 is closed, and is pivotably connected within the bonnet 22 to the adjacent side thereof at 32. The other arm 33 of each lever 28 is arranged to abut against a stop constituted by a surface 34 of the sub-frame 16 at an intermediate stage during opening of the bonnet 22, as hereinafter described. A flat nylon guide surface 35 is secured on the upper edge of the rear part of each side waist-rail 19, and two tab members 36, which project downwardly from the respective inwardly-turned lower edges 24 of the sides of the bonnet 22 near the rear end thereof, slideably engage the inner surfaces of the side waist-rails 19 as hereinafter described. Each of the tab members 36 fits, when the bonnet 22 is in closed position, in a slot between the inner surface of the associated side waist-rail 19 and a forwardly-projecting tab member 37 secured to said surface. The rear end of the inwardly-turned lower edge 24 of each side of the bonnet 22 fits, when the bonnet 22 is in closed position, in a slot between the associated guide surface 35 and a forwardly-projecting tab member 38 secured at the rear end of said surface. A catch 39 at the front end of the bonnet 22 clips it to the front waist-rail 18 when it occupies its closed position, and two laterally-spaced inwardly-inclined tab members 47 project upwardly from the forward extension 17 of the sub-frame 16 to contact the respective inwardly-turned lower edge 24 of the bonnet 22 and thus centralise the front end of the bonnet 22 when it occupies its closed position. A stay 40 pivotally mounted near one side of the upper end of the sub-frame 16 can be deployed to engage a first aperture (not shown) in the inwardly-turned lower edge 24 of the adjacent side of the bonnet 22 so as to secure the bonnet 22 in an almost fully opened position indicated at C in FIG. 1 with its front end clear of the grille 20, or to engage a second aperture (not shown) in said edge so as to secure the bonnet 22 in a more sloping less fully opened position if a front leader is fitted to the tractor. The stay 40 can be held by a clip 41 in a stowed position transversely alongside said end of the sub-frame 16, as shown in FIG. 3, when the bonnet 22 is closed.

In order to ensure that the tab members 36 projecting downwardly from the bonnet 22 do engage the inner surfaces of the respective side waist-rails 19 during closing of the bonnet 22 despite its inherent flexibility, an arch member 42 formed of steel rod of circular cross-section is secured between the side waist-rails 19 in a transverse plane which contains the tab members 36 when the bonnet is in the position indicated at B in FIG. 1. The arch member 42 co-acts with the bonnet 22 as hereinafter described.

In operation, the bonnet 22 is opened by lifting its front end to release the catch 39 and moving the front end in a curved path extending first upwardly and forwardly to the position indicated at A in FIG. 1 and then through a smaller angle downwardly and forwardly to the position indicated at B in FIG. 1 so as to pivot the bell-crank levers 28 relative to both the bonnet 22 and the sub-frame 16 until said other arms 33 of said levers abut against the surfaces 34. During this initial opening movement, the rear ends of the inwardly-turned lower edges 24 of the sides of the bonnet 22 slide forwardly on the nylon guide surfaces 35, and the bonnet sides are progressively sprung apart by sliding contact between the edges 24 and the arch member 42 to maintain contact between said ends and the surfaces 35. The rear end of the bonnet 22 is then moved upwardly and forwardly to swing the bonnet 22 in a secondary opening movement into the required one of its opened positions about its pivotal connections 32 to the arms 31 of the now stationary bell-crank levers 28. The bonnet 22 is secured in said one position by means of the stay 40.

To close the bonnet 22, the stay 40 is released and stowed, and the rear end of the bonnet 22 is moved rearwardly and downwardly to swing the bonnet 22 in an initial closing movement about its pivotal connections 32 to the arms 31 of the stationary bell-crank levers 28 into the position indicated at B in FIG. 1. As the bonnet 22 approaches the position B, the arch member 42 contacts the tab members 36 and guides them into engagement with the inner surfaces of the side waist-rails 19, and springs apart the sides of the bonnet 22 so that the rear ends of the inwardly-turned lower edges 24 thereof rest on the nylon guide surfaces 35. The front end of the bonnet 22 is then moved in a curved path extending first upwardly and rearwardly to the position indicated at A in FIG. 1 and then downwardly and rearwardly to pivot the bell-crank levers 28 relative to both the bonnet 22 and the sub-frame 16 until the bonnet 22 reached its fully closed position. During this secondary closing movement, the forward divergence of the sides of the bonnet 22 causes them to the sprung apart progressively less by the arch member 42, so that the tab members 36 maintain their engagement with the inner surfaces of the side waist-rails 19 and the rear ends of the inwardly-turned lower edges 24 of the sides of the bonnet 22 slide rearwardly on the nylon guide surfaces 35. The bonnet is held in its fully closed position by the tab members 36 fitting in the associated slots, by the rear ends of the inwardly-turned lower edges 24 of its sides fitting in their associated slots, and by the catch 39 at its front end clipping it to the front waist-rail 18.

In a modification suitable for bonnets for relatively short length and therefore reasonable rigidity, the arch member is dispensed with, the sides of the bonnet 22 have less rearward convergence than the side waist-rails 19, and the lower ends of the tab members 36 projecting downwardly from the bonnet 22 are inclined inwardly, that is to say towards one another, to ensure that the tab members 36 do engage the inner surfaces of the respective side waist-rails 19 near the end of the initial closing movement of the bonnet 22. This engagement causes the sides of the bonnet 22 to be sprung progressively together during its secondary closing movement. The forwardly-projecting tab members 37 secured to the inner surfaces of the respective side waist-rails 19 are cut away as indicated at 43 in FIG. 5 so as to accommodate the inwardly inclined lower ends of the tab members 36. During the initial opening movement of the bonnet 22, the progressive springing apart of its sides prevents its rear end falling between the side waist-rails 19 onto the engine 12 due to the forward divergence of said rails.

We claim:

1. Mechanism for enabling a vehicle bonnet to be opened and closed comprising two laterally-spaced bell-crank levers pivotable about a common axis disposed transversely on the vehicle's frame near the front end thereof, two side waist-rails secured to the frame, two members projecting downwardly from the respective sides of the bonnet near the rear end thereof, one arm of each lever extending rearwardly when the bonnet is closed and being pivotably connected to the adjacent side of the bonnet, and the other arm of each lever being arranged to abut against a stop on the frame when the bonnet has been initially moved forwardly by simultaneously pivoting the bonnet relative to the lever and the lever relative to the frame, whereafter the rear end of the bonnet is secondarily moved upwardly and forwardly into opened position by pivoting the bonnet relative to the stationary lever, the bonnet being closed by performing the same movements in reverse sequence, and an arch member secured between the side waist-rails to guide the bonnet near the end of its initial closing movement so as to ensure that the members projecting downwardly from the bonnet engage the inner surfaces of the respective side waist-rails and thus locate the rear end of the bonnet laterally.

2. Mechanism according to claim 1, wherein the side waist-rails converge rearwardly and the sides of the rear end of the bonnet, which is arched in transverse cross-section, are sprung apart by the arch member near the end of the initial opening movement of the bonnet and spring together as the secondary closing movement of the bonnet progresses.

* * * * *